United States Patent [19]

Miyagoshi et al.

[11] Patent Number: 5,518,581

[45] Date of Patent: May 21, 1996

[54] DEINKING AGENT FOR REGENERATION OF WASTE PAPER

[75] Inventors: Hiroaki Miyagoshi; Katsuhiko Takahara, both of Hukui, Japan

[73] Assignee: Nicca Chemical Co., Ltd., Hukui, Japan

[21] Appl. No.: 71,086

[22] Filed: Jun. 4, 1993

[51] Int. Cl.⁶ .................................................... D21C 5/02
[52] U.S. Cl. .................. 162/5; 162/4; 162/72; 162/75
[58] Field of Search .................. 162/5, 72, 4, 75; 252/61; 210/705, 704; 209/166

[56] References Cited

U.S. PATENT DOCUMENTS

| | | | |
|---|---|---|---|
| 4,659,519 | 4/1987 | Ku | 260/502 R |
| 4,710,267 | 12/1987 | Elsby et al. | 162/5 |
| 4,780,100 | 10/1988 | Moll | 8/137 |
| 4,959,123 | 9/1990 | Lehmann et al. | 162/5 |
| 5,158,697 | 10/1992 | Kawamori et al. | 252/60 |
| 5,200,034 | 4/1993 | Richmann et al. | 162/5 |
| 5,211,809 | 5/1993 | Naddeo et al. | 162/6 |
| 5,221,433 | 6/1993 | Daute et al. | 162/5 |
| 5,281,358 | 1/1994 | Urushibata et al. | 162/5 |
| 5,282,928 | 2/1994 | Takahashi et al. | 162/5 |

FOREIGN PATENT DOCUMENTS 2205723  3/1991  Japan.

*Primary Examiner*—Peter Chin
*Attorney, Agent, or Firm*—Millen, White, Zelano & Branigan

[57] ABSTRACT

A floatation method for the regeneration of waste paper employs as a deinking agent a reaction product of an alkylene oxide with a mixture of products obtained by the reaction of a natural oil or fat with an alkanolamine in a mole ratio of the natural oil or fat to the alkanolamine of products is in the range from 1:0.1 to 1:3,, wherein the amount of the alkylene oxide is in the range from 100 parts by weight to 1000 parts by weight based on 100 parts by weight of the mixture of products, provides pulp having higher degree of whiteness and less residual ink and problems caused by pitch than pulp prepared by a corresponding floatation method which employs a conventional deinking agent.

16 Claims, No Drawings

DEINKING AGENT FOR REGENERATION OF WASTE PAPER

BACKGROUND OF THE INVENTION

1. Field of the Invention

The present invention relates to a novel deinking agent for regeneration of waste paper to prepare regenerated pulp and to a floatation method employing it.

2. Description of the Prior Art

The floatation method is a known method of deinking for regeneration of waste paper. In the floatation method, waste paper is disaggregated by a pulper and the like and then deinking is effected with a deinking agent in combination with an alkali and a bleaching agent. Ink in the waste paper is separated from the pulp fibers to form aggregates. Air is blown into the pulp slurry thus formed to make foams. The ink which adheres to the foams is removed with the foams from the pulp slurry.

In the floatation method, various kinds of surface active agents have been utilized as the deinking agent. Soaps of higher fatty acids have long been the most popular agents. This kind of deinking agent has an excellent ability to form ink aggregates. However, adhesion of the ink to the apparatus occurs when this kind of deinking agent is utilized. Also, because the ability of this kind of deinking agent to make foams is not sufficient, the ink which is aggregated and floating cannot be removed completely with the foams. Thus, the ink occasionally remains in the pulp. Because their ability to make foams is insufficient, other foaming agents are generally utilized in combination with this kind of deinking agent.

Deinking agents other than soaps of higher fatty acids, such as anionic surface active agents, e.g., salts of alkylbenzenesulfonic acids, salts of higher alcohol sulfuric acid esters, salts of α-olefin sulfonic acids, dialkyl sulfosuccinates and the like and nonionic surface active agents like ethylene oxide adducts of alkylphenols, higher alcohols and fatty acids, alkanolamines and the like have been utilized recently. However, these deinking agents do not have sufficient ability to aggregate and remove ink in the floatation method. The problem of the insufficient ability of fatty acid soaps to make foams has been solved to some extent but a problem still remains, viz., foams made in the floatation method persist even after the period in which the foams are necessary has ended. Thus, the ink aggregated and adhered to the foams remains in the floatator longer than necessary. This situation occasionally causes the problem of ink spots.

When pulp regenerated by a floatation-type process is utilized, the so-called pitch trouble occurs rather frequently in the paper making process. This situation causes another problem, viz., agents such as pitch controlling agents must be added in larger amounts.

Japanese Patent Tokukai Sho 61-89394 teaches the use of a deinking composition for a flotation process comprising a polyoxyethylene oxide adduct of a higher fatty acid monoethanolamide. The English abstract of this publication identifies the surfactant component of the ink-removing composition as a polyethylene oxide adduct of a higher fatty acid monoethanolamide of the formula

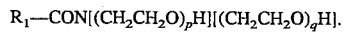

In contradistinction, applicants employ as the surfactant an alkylene oxide(s) adduct of the mixture of reaction products obtained by the reaction of a natural oil or fat with an alkanolamine, which mixture of reaction products is a mixture of:

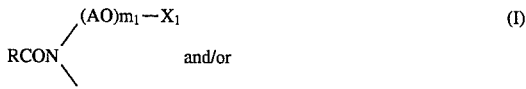

where
R means alkyl group of $C_7$–$C_{23}$,
AO means alkylene oxide of $C_2$–$C_6$,
$X_1$, $X_2$ means acyl group of $C_8$–$C_{24}$ or H,
$m_1$, $M_2$ means 1–200,
and

where
AO means alkylene oxide of $C_2$–$C_6$,
$X_3$, $X_4$, $X_5$ means acyl group of $C_8$–$C_{24}$ or H,
$n_1$, $n_2$, $n_3$ means 0–300.

This adduct of a mixture of reaction products performs as a deinking agent in a superior manner to the ethylene oxide adducts of the amides of JP Tokukai Sho 61-89394.

OBJECTS OF THE INVENTION

An object of the present invention is to provide a novel deinking agent for the regeneration of waste paper which has the ability to form aggregates of ink as good as the fatty acid soaps, the ability to make to a suitable degree foams to remove the aggregated and floating ink which are stable in the floatator but are easily defoamed outside the floatator, thereby providing deinked pulp having a high degree of whiteness and very little residual ink.

A further object is to provide a novel deinking agent for regeneration of waste paper which can reduce problems caused by the formation of pitch in the regenerated pulp.

Another object is to provide a floatation method for the regeneration of waste paper which employs the novel deinking agent of this invention.

SUMMARY OF THE INVENTION

The floatation method of the present invention for the regeneration of waste paper employs a novel deinking agent comprising a reaction product of an alkylene oxide with the mixture of products obtained by the reaction of a natural oil or fat with an alkanolamine in a mole ratio of the natural oil or fat to the alkanolamine in the range from 1:0.1 to 1:3, wherein the amount of the alkylene oxide is in the range from 100 parts by weight to 1000 parts by weight based on 100 parts by weight of the mixture of products.

Upon further study of the specification and appended claims, further objects and advantages of this invention will become apparent to those skilled in the art.

DETAILED DESCRIPTION OF THE INVENTION

An essential feature of the floatation method of the present invention is that the deinking agent is prepared by a simple method which employs, without the necessity of isolation or purification, the reaction product obtained by the amidation and transesterification of an inexpensive natural oil or fat. This makes the deinking agent and its use in a floatation method of regenerating waste paper commercially highly attractive.

Examples of the natural oil or fat used to produce the starting material to produce the deinking agent of the invention are animal oils and fats, such as lard, beef tallow, bone fats and the like, vegetable oils, such as olive oil, palm oil, soy bean oil, rapeseed oil, linseed oil, coconut oil and the like, fish oils, hardened oils and half hardened oils of the oils and fats described above, recovered oils in the process of purification of these oils and fats and the like oils and fats. Preferable examples of the natural oil or fat are beef tallow and half hardened beef tallow.

Examples of the alkanolamine employed, e.g., to produce the starting material used to produce the deinking agent of the invention are those wherein each alkanol group has 1–8, preferably 1–4 carbon atoms, e.g., monoethanolamine, diethanolamine, monoisopropanolamine, di-n-propanolamine and the like. Preferred are monoethanolamine and diethanolamine.

Examples of the alkylene oxide which is reacted with the mixture of products obtained by the reaction of the natural oil or fat with an alkanolamine are ethylene oxide, propylene oxide, butylene oxide and the like. A single alkylene oxide or a mixture of alkylene oxides can be employed, either as a mixture of two or more alkylene oxides (random addition) or by the consecutive addition reactions of two or more alkylene oxides (block addition). The random addition of ethylene oxide and another alkylene oxide and the block addition of ethylene oxide and another alkyleneoxide are preferred, with the random addition of ethylene oxide and propylene oxide being more preferred.

The mole ratio of the natural oil or fat to the alkanolamine in the mixtures of reaction products employed to produce the starting reactant with which the alkylene oxide is reacted is in the range from 1:0.1 to 1:3, preferably in the range from 1:0.5 to 1:2.

It is preferable that the amount of the alkylene oxide utilized for the reaction is in the range from 100 to 1000 parts by weight, preferably in the range from 300 to 800 parts by weight, based on 100 parts of the sum of the weight of the natural oil or fat and the weight of the alkanolamine employed as starting materials. The mole ratio of ethylene oxide and another alkylene oxide utilized in the reaction is preferably in the range from 1:1 to 5:1, more preferably in the range from 1:1 to 3:1. When the amount of the alkylene oxide is outside the range specified herein, the deinking property of the alkylene oxide adduct in the floatation process deteriorates and suitable foaming is not attained in the floatation.

The alkylene oxide addition reaction is conducted under conditions generally used for the addition reaction of an alkylene oxide to a compound having one or more active hydrogen. To the mixture of an oil or fat and an alkanolamine in the mole ratio specified above, a catalytic amount of an alkaline substance in the range from 0.1 to 1 parts by weight based on 100 parts by weight of the mixture is added. The oil or fat and the alkanolamine are reacted with the catalyst at the temperature in the range from 50° to 150° C. for from 30 minutes to 2 hours. Thereafter the reaction of the alkylene oxides with the above-mentioned reaction mixture is conducted at a temperature in the range from 100° to 200° C. at a pressure in the range from 1 to 5 kg/cm$^2$.

Because the oil or fat, the alkanolamine and the reaction catalyst, which preferably is alkaline, are mixed and reacted well before the addition reaction of the alkylene oxide, the reactant with which the alkylene oxide is reacted is a mixture of molecules designated by the general molecular formulae described before as (I), (II) and (III).

The deinking agent of the invention exhibits its excellent effects alone as well as in combination with conventional deinking agents, such as anionic surface active agents, like fatty acid soaps, salts of alkylbenzenesulfonic acids, salts of higher alcohol sulfuric acid esters and the like and nonionic surface active agents, like ethylene oxide adducts of alkylphenols, higher alcohols, fatty acids and the like. The deinking agent of the invention is effectively utilized when it is added in the process of the disaggregation of waste paper and in the process of kneader and the like. The amount thereof added is preferably in the range from 0.05 to 1.0 parts by weight based on the weight of the waste paper.

DESCRIPTION OF THE PREFERRED EMBODIMENTS

The invention will be understood more readily with reference to the following examples which illustrate the invention but are not to be construed to limit the scope of the invention.

In the following examples, % means by weight unless otherwise noted.

Example of Preparation of Deinking Agent

Coconut oil and monoethanolamine were charged in the mole ratio of 1:2 and 1.0 part by weight of sodium hydroxide, based on 100 parts by weight of the mixture of the coconut oil and monoethanolamine was added to the mixture. After the atmosphere in the reaction vessel was replaced with nitrogen, the mixture of coconut oil, monoethanolamine and sodium hydroxide is reacted at 120° C. for 1 hour under stirring. At the same time, water was removed from the mixture in vacuo under stirring by heating. Then, a mixture of 300 parts by weight of ethylene oxide (EO) and 100 parts by weight of propylene oxide (PO) were added to 100 parts by weight of the mixture of products obtained by the reaction of coconut oil with monoethanolamine. The addition reaction was conducted at 150° C. at the pressure of 3 kg/cm$^3$. After the reaction was finished, the reaction mixture was cooled to 60° C. and neutralized by adding acetic acid in the amount equimolar to sodium hydroxide utilized as the catalyst to obtain the deinking agent No. 1 of the invention. The deinking agents No. 1 through No. 26 listed in Table 1 and Table 3 were prepared by the same method as that described herein.

Properties of the deinking agent were evaluated using the sample sheets prepared in Examples 1 through 26. Degree of whiteness was measured using SM Color Computer® manufactured by Suga Shikenki Co., Ltd. Number of residual ink (diameter of ink particles of 2 μm or more) was measured by the personal image analyzer AVIO-XL-500® (× 100 magnification) manufactured by Olympus Co., Ltd.

Examples 1 through 13 and Comparative Examples 1 through 3

One hundred parts by weight of waste paper recovered from the market was shredded to thin shreds and then charged into a laboratory pulper. Into the pulper, water, 1.0 parts by weight of sodium hydroxide as an aqueous solution, 4.0 parts by weight of No. 3 sodium silicate, 1.0 parts by weight of hydrogen peroxide as an aqueous solution and 0.4 parts by weight of one of the deinking agents shown in Table 1 or prepared from the materials shown in Table 1 were added and the concentration of the pulp was adjusted to 5% by further addition of water. The amount of the added ingredients is shown as parts by weight based on the weight of the paper. The pulp was disaggregated at 50° C. for 10 minutes. Then, the mixture was diluted to a pulp concentration of 1.0% by addition of water and, after the floatation treatment at 30° C. for 10 minutes, the pulp slurry obtained was manually made into paper. Thus, a sample pulp sheet was prepared. Results of the evaluation are shown in Table 2.

Examples 14 through 26 and Comparative Examples 4 through 6

One hundred parts by weight of waste paper recovered from the market was shredded to the form of thin shreds and charged into a laboratory pulper. Into the pulper, water and 0.5 parts by weight of sodium hydroxide was added as an aqueous solution and the concentration of pulp was adjusted to 5% by further addition of water. After the pulp was disaggregated at 50° C. for 10 minutes, the concentration of

TABLE 1

| Example | natural oil (A) | alkanolamine (B) | mole ratio, A/B | alkylene oxide compound* | parts by weight based on 100 parts by weight of the material obtained by the reaction of the natural oil and alkanolamine. |
| --- | --- | --- | --- | --- | --- |
| 1 | coconut oil | monoethanolamine | 1/2 | EO/PO (random) | 300/100 |
| 2 | fish oil | monoethanolamine | 1/2 | EO/PO (random) | 250/150 |
| 3 | fish oil | monoethanolamine | 1/1 | EO/PO (random) | 250/200 |
| 4 | beef tallow | monoisopropanolamine | 1/2 | EO/PO (random) | 150/300 |
| 5 | palm oil | diethanolamine | 1/2 | EO | 300 |
| 6 | soy bean oil | diethanolamine | 1/1.5 | EO | 400 |
| 7 | beef tallow | monoethanolamine | 1/2 | EO/BO (block) | 400/200 |
| 8 | beef tallow | monoethanolamine | 1/0.5 | EO/BO (block) | 400/100 |
| 9 | coconut oil | diethanolamine | 1/1.0 | EO/PO (block) | 300/200 |
| 10 | fish oil | monoisopropanolamine | 1/2 | EO/BO (random) | 250/150 |
| 11 | beef tallow | diethanolamine | 1/1.5 | EO/PO (random) | 400/200 |
| 12 | palm oil | monoisopropanolamine | 1/2 | EO/PO (random) | 200/300 |
| 13 | palm oil | monoisopropanolamine | 1/0.5 | EO/PO (random) | 200/200 |
| Comparative example | | | | | |
| 1 | a salt of dodecylbenzenesulfonic acid | | | | |
| 2 | polyoxyethylene (10 mole) nonylphenyl ether | | | | |
| 3 | polyoxyethylene (10 mole) lauryl ether | | | | |

*EO: ethylene oxide, PO: propylene oxide, BO: butylene oxide

TABLE 2

| Example | degree of whiteness | number of residual ink (spots/5 observed areas) |
| --- | --- | --- |
| 1 | 53.0 | 105 |
| 2 | 54.5 | 98 |
| 3 | 53.5 | 114 |
| 4 | 53.9 | 110 |
| 5 | 52.4 | 123 |
| 6 | 52.9 | 145 |
| 7 | 53.6 | 109 |
| 8 | 53.4 | 110 |
| 9 | 54.0 | 111 |
| 10 | 52.0 | 132 |
| 11 | 54.1 | 117 |
| 12 | 54.2 | 109 |
| 13 | 53.8 | 118 |
| Comparative example | | |
| 1 | 50.0 | 203 |
| 2 | 50.9 | 222 |
| 3 | 50.1 | 230 | the pulp was adjusted to 20% by removing water. To the pulp mixture, 1.0 parts by weight of sodium hydroxide, 4.0 parts by weight of No. 3 sodium silicate, 1.0 parts by weight of hydrogen peroxide as an aqueous solution and 0.4 parts by weight of one of the deinking agents shown in Table 3 or prepared from the materials shown in Table 3 were added and the mixture was aged at 50° C. for 3 hours. Then, the mixture was diluted to the pulp concentration of 1.0% by addition of water and, after the floatation treatment at 30° C. for 10 minutes, the pulp slurry obtained was manually made into paper. Thus, a sample pulp sheet was prepared. Results of the evaluation are shown in Table 4.

TABLE 3

| Example | natural oil (A) | alkanolamine (B) | mole ratio, A/B | alkylene oxide compound* | parts by weight based on 100 parts by weight of the material obtained by the reaction of the natural oil and alkanolamine. |
|---|---|---|---|---|---|
| 14 | beef tallow | diethanolamine | 1/1 | EO | 400 |
| 15 | coconut oil | monoisopropanolamine | 1/2 | EO | 500 |
| 16 | palm oil | diethanolamine | 1/1.5 | EO/PO (random) | 150/300 |
| 17 | fish oil | monoethanolamine | 1/2 | EO/PO (block) | 300/100 |
| 18 | soy bean oil | monoisopropanolamine | 1/2 | EO/BO (random) | 250/150 |
| 19 | soy bean oil | monoisopropanolamine | 1/0.5 | EO/BO (random) | 250/150 |
| 20 | beef tallow | monoetbanolamine | 1/2 | EO/PO (block) | 400/300 |
| 21 | coconut oil | diethanolamine | 1/1 | EO/PO (block) | 300/150 |
| 22 | fish oil | monoethanolamine | 1/2 | EO/BO (random) | 250/200 |
| 23 | fish oil | monoethanolamine | 1/1.5 | EO/PO (random) | 250/200 |
| 24 | beef tallow | monaisopropanolamine | 1/2 | EO/PO (random) | 400/250 |
| 25 | palm oil | diethanolamine | 1/2 | EO/PO (random) | 200/300 |
| 26 | palm oil | diethanolamine | 1/0.5 | EO/PO (random) | 200/200 |

| Comparative example | | | | | |
|---|---|---|---|---|---|
| 4 | a salt of dodecylbenzenesulfonic acid | | | | |
| 5 | polyoxyethylene (10 mole) nonylphenyl ether | | | | |
| 6 | polyoxyethylene (10 mole) lauryl ether | | | | |

*EO: ethylene oxide, PO: propylene oxide, BO: butylene oxide

TABLE 4

| Example | degree of whiteness | number of residual ink (spots/5 observed areas) |
|---|---|---|
| 14 | 53.2 | 123 |
| 15 | 53.9 | 143 |
| 16 | 54.3 | 107 |
| 17 | 54.1 | 128 |
| 18 | 54.7 | 132 |
| 19 | 54.5 | 130 |
| 20 | 54.2 | 111 |
| 21 | 55.0 | 95 |
| 22 | 53.9 | 99 |
| 23 | 54.0 | 105 |
| 24 | 54.8 | 121 |
| 25 | 54.5 | 118 |
| 26 | 54.4 | 112 |
| Comparative example | | |
| 4 | 50.9 | 210 |
| 5 | 51.2 | 232 |
| 6 | 51.0 | 221 |

The superior results achieved by the floatation method of this invention are shown in the comparative examples which follow, in which the floatation method employed an ethanolamide of formula (I), an anionic surface active agent of formula (II) and a fatty acid (salt) as described in the English abstract of JP Tokukai Sho 61-89394. The results achieved with such a deinking agent are compared with the method of the present invention.

Additional comparative examples are also described in which an alkanolamide ester or a glyceride compound is used alone and the results are compared with those of the present invention. The present invention shows better results compared to all of them.

Comparative Examples 7 to 16

Waste paper was treated and evaluated by the same method as in Examples 1 to 13 of this invention, using the compounds shown in Table 5, below. The results are shown in Table 6.

TABLE 5

| Comparative Example | compounds | mole ratio of EO/PO in adduct | alkylene oxide compound* | parts by weight based on 100 parts by weight of the material |
|---|---|---|---|---|
| 7 | coconut oil, monoethanolamine, EO/PO Adduct | 1/5 | EO/PO (random) | 300/100 |
| 8 | fish oil, diethanolamine, EO/PO Adduct | 1/0.05 | EO/PO (random) | 250/100 |
| 9 | monoester of oleic acid with glycerine (EO) 30 mol (PO) 20 mol (block) | — | — | — |
| 10 | coconut fatty acid diethanolamide (EO) 10 mol (PO) 10 mol (random) | — | — | — |
| 11 | coconut fatty acid monoethanolamide (EO) 10 mol/ lauryl alcohol (EO)$_3$SO$_3$Na/stearic acid | 10/10/80 (weight ratio) | — | — |
| 12 | stearic acid monoethanolamide (EO) 20 mol/octyl | 20/10/70 | — | — |

TABLE 5-continued

| Comparative Example | compounds | mole ratio of EO/PO in adduct | alkylene oxide compound* | parts by weight based on 100 parts by weight of the material |
|---|---|---|---|---|
| 13 | phenol (EO)$_3$SO$_3$Na/stearic acid stearic acid monoethanolamide (EO) 20 mol | (weight ratio) | — | — |
| 14 | a salt of dodecylbenzenesulfonic acid | — | — | — |
| 15 | polyoxyethylene (10 mol) nonyl phenyl ether | — | — | — |
| 16 | polyoyethylene (10 mol) lauryl ether | — | — | — |

TABLE 6

| Comparative Example | degree of whiteness | number of residual ink (spots/5 observed areas) |
|---|---|---|
| 7 | 51.6 | 152 |
| 8 | 50.3 | 177 |
| 9 | 51.2 | 159 |
| 10 | 50.0 | 218 |
| 11 | 52.2 | 152 |
| 12 | 52.0 | 155 |
| 13 | 49.6 | 225 |
| 14 | 50.0 | 203 |
| 15 | 50.9 | 222 |
| 16 | 50.1 | 230 |

Comparative Examples 17 to 26

Waste paper was treated and evaluated by the same method as in Examples 14 to 26 of this invention using the compounds shown in Table 7. The results are shown in Table 8.

TABLE 7

| Comparative Example | the natural oil and compounds | mole ratio | alkylene oxide compound* | parts by weight based on 100 parts by weight of the material obtained by alkanolamine. |
|---|---|---|---|---|
| 17 | coconut oil, monoethanolamine | 1/5 | EO/PO (random) | 300/100 |
| 18 | fish oil, diethanolamine | 1/0.05 | EO/PO (random) | 250/150 |
| 19 | monoester of oleic acid with glycerine (EO) 30 mol (PO) 20 mol (random) | — | — | — |
| 20 | coconut fatty acid diethanolamide (EO) 10 mol (PO) 10 mol (random) | — | — | — |
| 21 | coconut fatty acid monoethanolamide (EO) 10 mol/ lauryl alcohol (EO)$_3$SO$_3$Na/stearic acid | 10/10/80 (weight ratio) | — | — |
| 22 | stearic acid monoethanolamide (EO) 20 mol/octyl phenol (EO)$_3$SO$_3$Na/stearic acid | 20/10/70 (weight ratio) | — | — |
| 23 | stearic acid monoethanolamide (EO) 20 mol | — | — | — |
| 24 | a salt of dodecylbenzenesulfonic acid | — | — | — |
| 25 | polyoxyethylene (10 mol) nonyl phenyl ether | — | — | — |
| 26 | polyoyethylene (10 mol) lauryl ether | — | — | — |

*EO: ethylene oxide, PO: propylene oxide

TABLE 8

| Comparative Example | degree of whiteness | number of residual ink (spots/5 observed areas) |
|---|---|---|
| 17 | 52.2 | 160 |
| 18 | 50.4 | 171 |
| 19 | 52.6 | 153 |
| 20 | 50.4 | 211 |
| 21 | 52.5 | 148 |
| 22 | 52.3 | 151 |
| 23 | 50.1 | 209 |
| 24 | 50.9 | 210 |
| 25 | 51.2 | 232 |
| 26 | 51.0 | 221 |

The following conclusions can be drawn from the foregoing comparative examples.

1) In Additional Comparative Examples 7, 8, 17 and 18, the conditions of the treatments were outside of the range of 1:0.1 to 1:3 of claim 1. The deinking affect in these examples in inferior to that achieved by the method of the invention.

2) In the treatments of Additional Comparative Examples 9, 10, 19 and 20, a single compound from the mixture of compounds employed in applicants' invention was used. The effect of the deinking in these examples are inferior to that obtained according to the method of the invention, thus establishing that the use of a single compound is not very effective. These examples clearly show the favorable effect of the method of invention which takes advantage of the synergistic effect obtained from the use of a mixture of alkylene oxide adducts.

3) In Additional Comparative Examples 11, 12, 13, 21, 22 and 26, the preparations were according to JP Tokukai Sho 61-89394, in which an adduct of a fatty acid monoethanolamide and "an alkylene oxide" a fatty acid and an anionic surface active agent were used together. The deinking effect achieved in these examples is inferior to that obtained by the method of applicants' invention.

To summarize the advantages obtained by the invention, by utilizing the deinking agent of the invention, deinked pulp having higher degree of whiteness and less number of residual ink than pulp prepared by the floatation treatment with conventional deinking agents is obtained. Because the pulp prepared by utilizing the deinking agent of the invention has less number of residual ink, troubles caused by pitch can be reduced.

While the invention has been particularly shown and described with reference to preferred embodiments thereof, it will be understood by those skilled in the art that the foregoing and other changes in form and details can be made therein without departing from the spirit and scope of the invention.

What is claimed:

1. In a floatation method of deinking waste paper, the improvement which comprises employing as the deinking agent the unpurified reaction product of an alkylene oxide with the mixture of products obtained by the reaction of a natural oil or fat with an alkanolamine in a mole ratio of the natural oil or fat to the alkanolamine, in the range from 1:0.1 to 1:3, wherein the amount of the alkylene oxide is in the range from 300 parts by weight to 700 parts by weight based on 100 parts by weight of the mixture of products, wherein the alkylene oxide is ethylene oxide or ethylene oxide with propylene oxide or butylene oxide in a mole ratio of at least 1:1 and wherein the alkanolamine is monoethamolamine, diethanolamine or monoisopropanolamine.

2. A floatation method for the regeneration of waste paper as claimed in claim 1, wherein the mole ratio of the natural oil or fat to the alkanolamine is in the range from 1:0.5 to 1:2.

3. A floatation method for the regeneration of waste paper as claimed in claim 1, wherein the natural oil or fat is an animal oil.

4. A floatation method for the regeneration of waste paper as claimed in claim 1, wherein the alkanolamine is monoethanolamine or diethanolamine.

5. A floatation method for the regeneration of waste paper as claimed in claim 1, wherein the alkylene oxide is an adduct of ethylene oxide and another alkylene oxide which is propylene oxide or butylene oxide.

6. A floatation method for the regeneration of waste paper as claimed in claim 5, wherein the mol ratio of ethylene oxide to the other alkylene oxide is from 1:1 to 5:1.

7. A floatation method for the regeneration of waste paper as claimed in claim 5, wherein the mol ratio of ethylene oxide to the other alkylene oxide is from 1:1 to 3:1.

8. A floatation method for the regeneration of waste paper as claimed in claim 1, wherein the adduct is a random adduct of ethylene oxide and propylene oxide.

9. A floatation method for the regeneration of waste paper as claimed in claim 5, wherein the adduct is an adduct of ethylene oxide and propylene oxide.

10. A floatation method for the regeneration of waste paper as claimed in claim 9, wherein the mol ratio of ethylene oxide to propylene oxide is from 1:1 to 5:1.

11. A floatation method for the regeneration of waste paper as claimed in claim 10, wherein the mol ratio of ethylene oxide to propylene oxide is from 1:1 to 3:1.

12. A floatation method for the regeneration of waste paper as claimed in claim 5, wherein the adduct is a block adduct of ethylene oxide and another alkylene oxide.

13. A floatation method for the regeneration of waste paper as claimed in claim 5, wherein the adduct is a block adduct of ethylene oxide and propylene oxide.

14. A floatation method according to claim 1, wherein the reaction product comprises an adduct of an alkylene oxide to the fatty acid alkanolamide ester which are obtained by the reaction of the natural oil or fat with the alkanolamine; wherein the natural oil or fat is an animal oil; wherein the alkanolamine is monoethanolamine or diethanolamine; wherein the alkylene oxide is ethylene oxide of ethylene oxide with propylene oxide; and wherein the mole ratio of the natural oil or fat to the alkanolamine is in the range from 1:0.5 to 1:2.

15. The floatation method of claim 1, wherein the alkanolamine is monoethanolamine or diethanolamine and the reaction of the natural oil or fat therewith is conducted at from 50° to 150° at a mole ratio of the natural oil or fat to the alkanol amine of from 1:0.5 to 1:2 in the presence of an alkaline catalyst and with removal of water of reaction.

16. The floatation method of claim 15, wherein the alkylene oxide is added to the unpurified reaction mixture obtained by the reaction of the natural oil or fat with the alkanolamine and the deinking agent is the thus-obtained unpurified alkylene oxide adduct.

* * * * *